(12) United States Patent
Klaussner et al.

(10) Patent No.: US 11,081,923 B2
(45) Date of Patent: Aug. 3, 2021

(54) CORONA SHIELDING SYSTEM FOR AN ELECTRICAL MACHINE

(71) Applicant: Siemens Aktiengesellschaft, Munich (DE)

(72) Inventors: Bernhard Klaussner, Nuremberg (DE); Jiri Lang, Nuremberg (DE); Steffen Lang, Hallerndorf (DE); Alexander Litinsky, Duesseldorf (DE); Guido Schmidt, Leichlingen (DE); Christian Schulz-Drost, Nuernberg-Neunhof (DE); Klaus Schaefer, Nuremberg (DE); Christian Staubach, Marl (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 343 days.

(21) Appl. No.: 15/511,326

(22) PCT Filed: Aug. 3, 2015

(86) PCT No.: PCT/EP2015/067785
§ 371 (c)(1),
(2) Date: Mar. 15, 2017

(87) PCT Pub. No.: WO2016/045844
PCT Pub. Date: Mar. 31, 2016

(65) Prior Publication Data
US 2017/0294817 A1    Oct. 12, 2017

(30) Foreign Application Priority Data
Sep. 25, 2014  (DE) ............... 10 2014 219 439.3

(51) Int. Cl.
*H02K 3/40* (2006.01)

(52) U.S. Cl.
CPC .................... *H02K 3/40* (2013.01)

(58) Field of Classification Search
CPC ... H02K 3/40; H02K 3/42; H01B 3/04; H01B 3/10; H01B 3/12
(Continued)

(56) References Cited

U.S. PATENT DOCUMENTS

| 5,300,844 A | 4/1994 | Schuler | 310/215 |
| 5,319,276 A | 6/1994 | Schuler | 310/196 |

(Continued)

FOREIGN PATENT DOCUMENTS

| CA | 2360321 A | 7/2000 | H02K 15/10 |
| CN | 1080096 A | 12/1993 | H01K 15/12 |

(Continued)

OTHER PUBLICATIONS

Machine Translation, Groeppel, EP-2362399-A1, Aug. 2011. (Year: 2011).*

(Continued)

*Primary Examiner* — Thomas Truong
(74) *Attorney, Agent, or Firm* — Slayden Grubert Beard PLLC

(57) ABSTRACT

The present disclosure relates to electrical machines. The teachings thereof may be embodied in a corona shielding system for an electrical machine. For example, a corona shielding system may include: an outer corona shield and an overhang corona shielding. The outer corona shielding and the overhang corona shielding may comprise a first corona shielding material having a nonlinear field strength-dependent electrical resistance.

10 Claims, 1 Drawing Sheet

Figure 1:
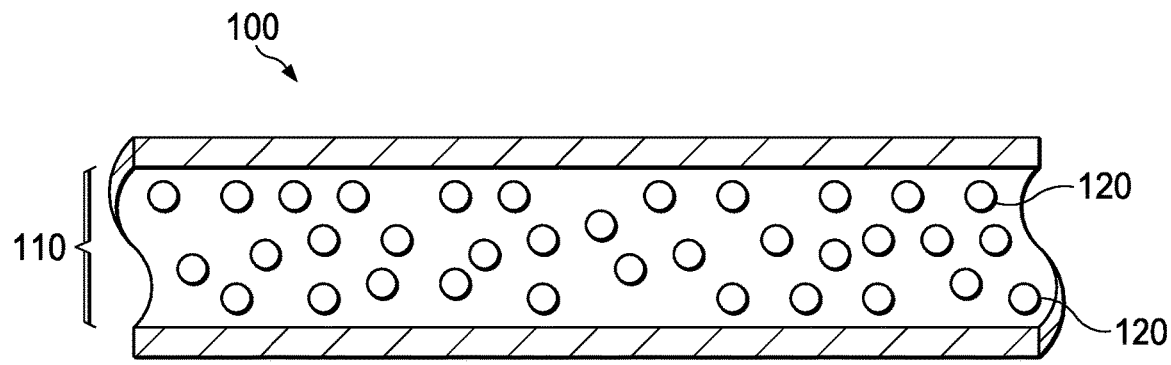

(58) Field of Classification Search
USPC .................................. 310/43, 196, 214, 215
See application file for complete search history.

(56) References Cited

U.S. PATENT DOCUMENTS

| | | | |
|---|---|---|---|
| 5,468,916 A | 11/1995 | Litenas et al. | 174/127 |
| 6,017,627 A | 1/2000 | Iwata et al. | 428/375 |
| 6,075,303 A * | 6/2000 | Schuler | H02K 3/40 |
| | | | 156/53 |
| 6,242,825 B1 | 6/2001 | Mori et al. | 310/45 |
| 9,396,837 B2 | 7/2016 | Kempen et al. | |
| 9,589,699 B2 | 3/2017 | Gröppel et al. | |
| 2002/0029897 A1 | 3/2002 | Younsi et al. | 174/120 R |
| 2003/0160676 A1 * | 8/2003 | Valdemarsson | H01F 27/288 |
| | | | 336/206 |
| 2007/0114704 A1 | 5/2007 | Stevens et al. | 264/643 |
| 2008/0066942 A1 * | 3/2008 | Miller | H01B 3/04 |
| | | | 174/36 |
| 2008/0143010 A1 | 6/2008 | Kashikar et al. | 264/112 |
| 2012/0068560 A1 * | 3/2012 | Anderton | H02K 3/38 |
| | | | 310/52 |
| 2013/0244022 A1 | 9/2013 | Rueger et al. | 428/324 |
| 2014/0345907 A1 | 11/2014 | Kempen et al. | 174/127 |

FOREIGN PATENT DOCUMENTS

| | | | |
|---|---|---|---|
| CN | 1338141 A | 2/2002 | H02K 15/10 |
| CN | 102020850 A | 4/2011 | C08G 73/10 |
| CN | 103580338 A | 2/2014 | H02K 3/04 |
| DE | 102009039457 A1 | 3/2011 | H01B 3/22 |
| DE | 102010009462 A1 | 9/2011 | H02K 3/40 |
| DE | 102010052889 A1 | 6/2012 | C09C 1/28 |
| DE | 102011083214 A1 | 3/2013 | H01B 13/16 |
| DE | 102011083228 A1 | 3/2013 | H01B 13/08 |
| DE | 102012208226 A1 | 11/2013 | H01B 13/22 |
| EP | 0049128 A1 | 4/1982 | H01B 3/04 |
| EP | 0573796 A1 | 12/1993 | H02K 3/40 |
| EP | 2362399 A1 | 8/2011 | H01B 3/02 |
| EP | 2362399 A1 * | 8/2011 | H02K 3/40 |
| EP | 2582018 A1 | 4/2013 | H02K 3/40 |
| JP | 61022733 A * | 1/1986 | H02K 3/40 |
| JP | 06217484 A | 8/1994 | H02K 3/34 |
| JP | 10116720 A | 5/1998 | H01B 17/56 |
| JP | 2005083760 A | 3/2005 | G04B 19/06 |
| JP | 2014112985 A | 6/2014 | H02K 3/34 |
| RU | 2088024 C1 | 8/1997 | H02K 3/40 |
| RU | 2100890 C1 | 12/1997 | H02K 3/30 |
| RU | 2291542 C2 | 1/2007 | H02K 15/10 |

OTHER PUBLICATIONS

Myounggu Park et al 2008 Nanotechnology, Strain-dependent electrical resistance of multiwalled carbon nanotube/polymer composite films. (Year: 2008).*

Russian Office Action, Application No. 2017113770/07, 7 pages, dated Dec. 14, 2017.

Japanese Office Action, Application No. 2017516479, 4 pages, dated May 21, 2018.

Chinese Office Action, Application No. 201580051404.6, 6 pages, dated Sep. 18, 2017.

International Search Report and Written Opinion, Application No. PCT/EP2015/067788, 11 pages, dated Nov. 10, 2015.

International Search Report and Written Opinion, Application No. PCT/EP2015/067791, 12 pages, dated Nov. 11, 2015.

International Search Report and Written Opinion, Application No. PCT/EP2015/067785, 12 pages, dated Nov. 25, 2015.

Japanese Office Action, Application No. 2017516479, 4 pages, dated Feb. 25, 2019.

Chinese Office Action, Application No. 201580051374.9, 8 pages, dated Mar. 13, 2019.

Indian Office Action, Application No. 201717007794, 5 pages, dated Mar. 29, 2019.

U.S. Non-Final Office Action, U.S. Appl. No. 15/511,344, 33 pages, dated May 1, 2019.

U.S. Non-Final Office Action, U.S. Appl. No. 15/511,306, 29 pages, dated May 1, 2019.

U.S. Final Office Action, U.S. Appl. No. 15/511,344, 14 pages, dated Aug. 15, 2019.

U.S. Final Office Action, U.S. Appl. No. 15/511,306, 14 pages, dated Aug. 15, 2019.

U.S. Ex Parte Quayle Action, U.S. Appl. No. 15/511,344, 10 pages, filed Nov. 27, 2019.

U.S. Non-Final Office Action, U.S. Appl. No. 15/511,306, 7 pages, dated Jan. 7, 2020.

European Office Action, Application No. 15747786.0, 5 pages, dated Sep. 24, 2020.

* cited by examiner

CORONA SHIELDING SYSTEM FOR AN ELECTRICAL MACHINE

CROSS-REFERENCE TO RELATED APPLICATIONS

This application is a U.S. National Stage Application of International Application No. PCT/EP2015/067785 filed Aug. 3, 2015, which designates the United States of America, and claims priority to DE Application No. 10 2014 219 439.3 filed Sep. 25, 2014, the contents of which are hereby incorporated by reference in their entirety.

TECHNICAL FIELD

The present disclosure relates to electrical machines. The teachings thereof may be embodied in a corona shielding system for an electrical machine.

BACKGROUND

Electrical machine may include high-voltage machines, e.g., a generator for generating electrical energy and/or an electric motor and/or another electrical operating means having a relatively high rated voltage, such as, in particular, a transformer, a bushing, or a cable. These machines of ever higher power are being developed, since advancing technology is requiring ever higher power densities.

A high-performance generator, such as a turbo generator, has a stator with a (stator) laminated core and a plurality of generator slots in which the generator winding is located. The main insulation of the generator winding against the laminated core is under high electrical load. High voltages arise during operation and must be dissipated in the insulation volume between the conductor bar under high voltage and the laminated core which is at ground potential. This leads to excessive increases in the field at the edges of the laminations in the laminated core, and these in turn cause partial discharges. The partial discharges, when they meet the insulation system, lead to very intense local heating. This gradually breaks down the organic materials of the insulation system, including the materials of the outer corona shielding system, into volatile products of low molecular weight, for example into carbon dioxide.

An important constituent part of the insulation system is what is called the outer corona shielding. In relatively large generators and electric motors, it is applied directly to the surface of the generator winding insulation. Typically, the outer corona shielding comprises carbon black- and graphite-containing tapes or coatings. The outer corona shielding must have a certain square resistance which lies within a specific range. If it is too low, the laminated cores can be electrically short-circuited, which can lead to high induced circulating currents, occurring across the ends of the laminated core and the outer corona shielding and lead to high-current arcs. In the case of excessive resistance, by contrast, high-voltage spark erosion can occur.

SUMMARY

Capacitive/resistive field control may reduce the increase in field strength in the region of the overhang of the corona shielding. Capacitive control is implemented by the insulating materials of the insulation system, while resistive control is implemented by the overhang corona shielding. The overhang corona shielding is conductive surface coverings at the outlets of the conductor bars from the laminated core. The surface coverings typically have a square electrical resistance of approximately $10^8$ to $10^{10}$ Ohm. A more homogeneous electrical field distribution is achieved by means of the overhang corona shielding. A severe nonlinearity of the resistance of the materials used in the overhang corona shielding is used in an attempt to force the electrical field out of the regions of high field strengths. This nonlinearity leads to a reduction in the specific resistance as the electrical field strength increases. Surface coverings of this kind can be realized either as coats with drying and curable resins, which are applied directly onto the insulating material surface, or together with tapes.

The teachings of the present disclosure may provide an improved corona shielding system for an electrical machine. In particular, they may enable manufacture of the corona shielding system in a particularly simple manner. In addition, overhang corona shielding and outer corona shielding may be particularly well electrically matched to one another in an expedient manner. In particular, the corona shielding system may have a long service life.

Some embodiments may include a corona shielding system for an electrical machine comprising an outer corona shielding and an overhang corona shielding, in which both the outer corona shielding and the overhang corona shielding are formed with the same corona shielding material which has a nonlinear field strength-dependent electrical resistance.

In some embodiments, the outer corona shielding, at least partly, and the overhang corona shielding, at least partly, are formed from the same corona shielding material.

In some embodiments, at least a portion of the outer corona shielding and at least a portion of the overhang corona shielding are designed such that they can be handled in one piece.

In some embodiments, the corona shielding material has an electrical resistance which becomes lower the greater an electrical operating field of the electrical machine in which the corona shielding material, at least during operation, is located.

In some embodiments, the corona shielding material has a matrix and a filler which is arranged within the matrix.

In some embodiments, the matrix is a polymeric matrix.

In some embodiments, the filler comprises globular and/or planar particles.

In some embodiments, the filler is formed with mica.

In some embodiments, the matrix has glass fibers.

In some embodiments, at least a portion of the corona shielding material forms a tape and/or a coating.

Some embodiments may include an electrical machine comprising a corona shielding system as described above.

In some embodiments, the electrical machine comprises a high-voltage machine.

In some embodiments, the corona shielding material, at least partly, is arranged on a main insulation of the electrical machine.

Some embodiments comprise at least one conductor bar and a corona shielding system in which the corona shielding material, at least partly, is applied to the or at least one of the conductor bars and/or the electrical insulation thereof or is arranged on the or at least on one of the conductor bars and/or the electrical insulation thereof.

DETAILED DESCRIPTION

The teachings of the present disclosure may be embodied in a corona shielding system for an electrical machine, e.g., a generator for generating electrical energy and/or an electric motor and/or another electrical operating means having a relatively high rated voltage, such as, in particular, a transformer, a bushing, or a cable. In some embodiments, the corona shielding system includes an outer corona shielding and an overhang corona shielding. In some embodiments, both the outer corona shielding and the overhang corona shielding are formed with the same corona shielding material which has a nonlinear field strength-dependent electrical resistance.

In some embodiments, the corona shielding material has a nonlinear field strength-dependent electrical resistance. The material may include a partial discharge-resistant overhang corona shielding tape, as is disclosed in laid-open specification DE 10 2010 009462 A1. The overhang corona shielding tape may be applied to a main insulation of a stator winding of the electrical machine, wound around the main insulation, over the entire original length of the outer corona shielding and overhang corona shielding. Therefore, the overhang corona shielding tape may have a nonlinear electrical resistance characteristic to allow efficient potential control at the end of the outer corona shielding.

In some embodiments, the electrical resistance may be in a working range of from 0.1 to 0.3 kV/mm is $10^4$ to $10^7$ $\Omega$m. There is a pronounced nonlinear field strength-dependent electrical resistance of the overhang corona shielding tape, so the tape can also be used in the slot region of the stator winding. In the region of the laminated core and/or an external outer corona shielding conductive nonwoven, the radial field strength over the main insulation of the stator winding may be up to approximately 3 kV/mm, depending on a position of the stator winding within the laminated core.

In such embodiments, the overhang corona shielding tape may be very conductive and function as an additional outer corona shielding layer at high operating field strengths and therefore close to the phase connections. At low operating field strengths, e.g., at a distance from the laminated core, the overhang corona shielding tape has a very high resistance and acts as an additional insulating layer. The overhang corona shielding material may be formed as an overhang corona shielding coating instead of an overhang corona shielding tape.

FIG. 1 shows an example corona shielding system 100 for an electrical machine incorporating the teachings of the present disclosure. The corona shielding system 100 comprises a polymeric matrix 110 and a filler 120 disposed in the polymeric matrix 110.

Figure 2:
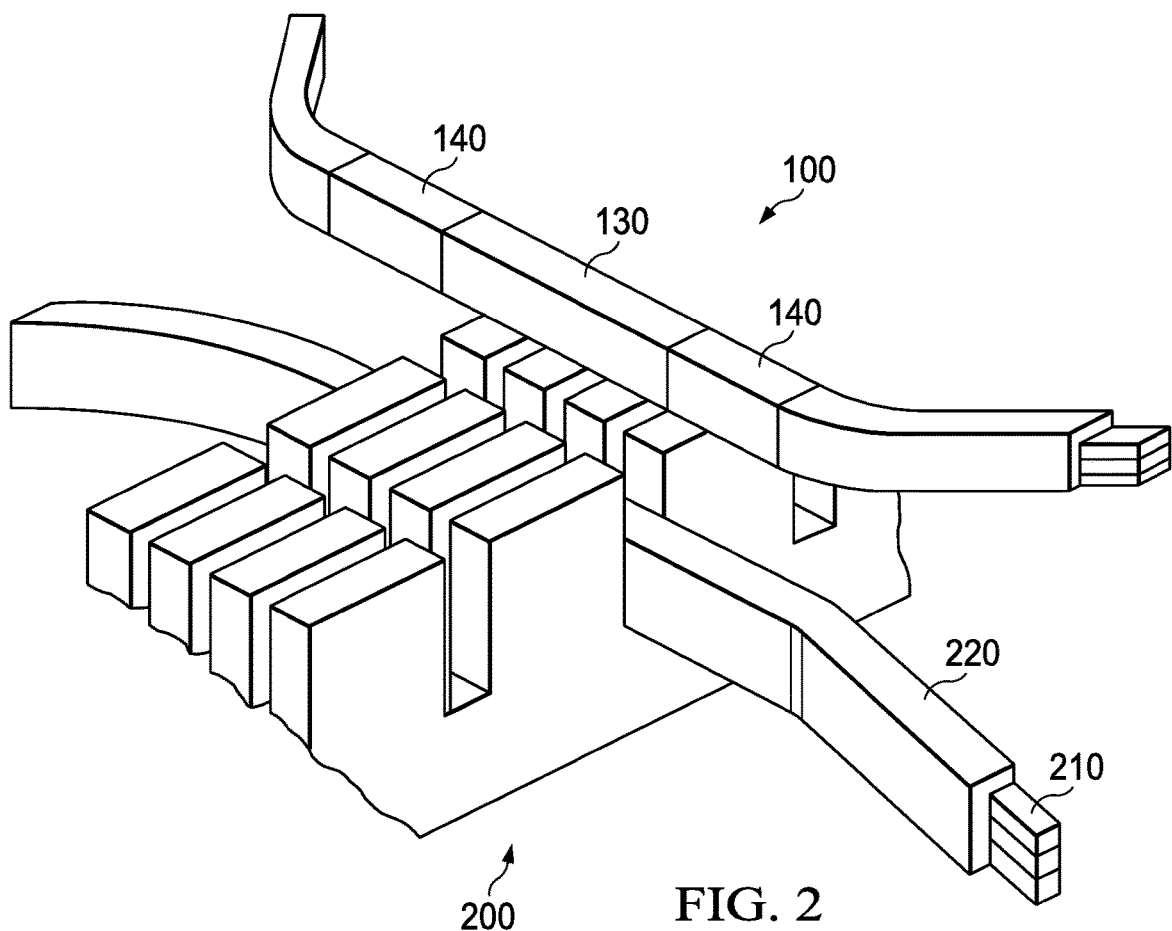

FIG. 2 shows a portion of an example electrical machine 200 incorporating the teachings of the present disclosure. The electrical machine 200 comprises a high-voltage machine 210 with a set of windings 210 having an electrical insulator 220 and a corona shielding system 100. The corona shielding system 100 comprises a polymeric matrix 110 and a filler 120 disposed in the polymeric matrix 110. Further, the corona shielding system 100 may include a partial discharge-resistant overhang corona shielding tape which may be applied to a main insulation of a stator winding of the electrical machine, wound around the electrical insulator 220, over the entire original length of the outer corona shielding 130 and the overhang corona shielding 140.

The corona shielding system may therefore be formed in a particularly simple manner. In some embodiments, both the outer corona shielding and also the overhang corona shielding can be formed by means of the same corona shielding material. The corona shielding system may be of particularly simple construction. In addition, particularly close electrical coupling between the overhang corona shielding and the outer corona shielding is realized by means of forming both the outer corona shielding and also the overhang corona shielding with the same corona shielding material. An outer corona shielding conductive nonwoven layer is preferably formed together with the overhang corona shielding.

In some embodiments, the outer corona shielding, at least partly, and the overhang corona shielding, at least partly, are formed from the same corona shielding material. Particularly simple manufacture and particularly close electrical coupling of the outer corona shielding and the overhang corona shielding are ensured specifically with this development. In some embodiments, at least a portion of the outer corona shielding and at least a portion of the overhang corona shielding are formed with an overhang corona shielding tape and/or with an overhang corona shielding coating as described above.

In some embodiments, at least a portion of the outer corona shielding and at least a portion of the overhang corona shielding can be handled in one piece. Manufacture and handling during the manufacturing process may be made easier with the design of at least a portion of the outer corona shielding and a portion of the overhang corona shielding as overhang corona shielding tape.

In some embodiments, the corona shielding material has an electrical resistance which becomes lower the greater an electrical operating field of the electrical machine in which the corona shielding material, in particular during operation, is located.

A particularly strong electrical operating field prevails specifically in the region of the outer corona shielding during operation. In the case of a severe nonlinearity of the corona shielding material, the electrical resistance of the corona shielding material in the region of the outer corona shielding is sufficiently low to prevent or to reduce potential peaks along the length of a conductor bar of the stator winding. In the region of the ends of a conductor bar of this kind however, the electrical resistance of the corona shielding material is sufficiently high, so that the corona shielding material forms an additional insulating layer which effectively reduces or prevents potential peaks in this region.

In some embodiments, the corona shielding material includes a matrix and a filler arranged within the matrix. The matrix may include a polymeric matrix, e.g., a plastic matrix and/or resin. The polymeric matrix may include a thermoplastic and/or a thermoset and/or an elastomer.

In some embodiments, the filler is formed by particles with dimensions of, at least on (in particular arithmetic) average, at most one millimeter and preferably of, at least on (in particular arithmetic) average, at most 100 micrometers. The filler expediently comprises partial discharge-resistant and electrically conductive particles. In a suitable manner, the particles comprise a partial discharge-resistant core and a partial discharge-resistant coating which is conductive.

In some embodiments, the filler, in a suitable manner, comprises globular and/or planar particles. Globular particles refer to those particles in which the dimensions in different spatial directions differ by less than a factor of at most 3, e.g., at most 1.5. Planar particles refer to those particles of which the dimensions in at least one spatial direction differ by a factor of at least 3, e.g., at least 5, from the dimensions in a direction, and/or two directions, perpendicular thereto.

In some embodiments, the filler comprises mica. In some embodiments, the matrix comprises glass fibers. In some embodiments, at least a portion of the corona shielding material forms a tape and/or a coating in the corona shielding system.

In some embodiments, an electrical machine includes a corona shielding system as described above. In some embodiments, the electrical machine comprises a high-voltage machine, e.g., a generator for generating electrical energy and/or an electric motor and/or another electrical operating means having a relatively high rated voltage, such as, in particular, a transformer, a bushing, or a cable.

In some embodiments, the corona shielding material is arranged, at least partly, on a main insulation of the electrical machine. The main insulation may be arranged on a conductor bar and/or on a stator winding of the electrical machine. In some embodiments, the electrical machine includes at least one conductor bar and a corona shielding system as described above, wherein the corona shielding material of the corona shielding system, at least partly, is applied to the or at least one of the conductor bars and/or the electrical insulation thereof or is arranged on the winding bar or at least on at least one of the conductor bars and/or the electrical insulation thereof.

What is claimed is:

1. A corona shielding system for an electrical machine, the system comprising:
   an outer corona shielding; and
   an overhang corona shielding;
   wherein both the outer corona shielding and the overhang corona shielding comprise a first corona shielding material having a nonlinear field strength-dependent electrical resistance;
   wherein both the outer corona shielding and the overhang corona shielding comprise a second material having a different electrical resistance from the first corona shielding material; and
   the first corona shielding material has an associated electrical resistance in a working range from 0.1 to 0.3 kV/mm of $10^4$ to $10^7$ Ωm;
   wherein the first corona shielding material includes a matrix and a filler, the filler comprising partial discharge-resistant mica particles with average particle size of no more than one millimeter.

2. The corona shielding system as claimed in claim 1, wherein at least a portion of the outer corona shielding and at least a portion of the overhang corona shielding comprise an integral piece.

3. The corona shielding system as claimed in claim 1, wherein the first corona shielding material has an electrical resistance reducing in proportion to an increase in an electrical operating field in which the corona shielding material is located.

4. The corona shielding system as claimed in claim 1, wherein the matrix comprises a polymer.

5. The corona shielding system as claimed in claim 4, wherein the matrix further comprises glass fibers.

6. The corona shielding system as claimed in claim 1, wherein the mica particles comprise globular and/or planar particles.

7. An electrical machine comprising:
   a set of windings;
   an electrical insulator disposed at least on the set of windings;
   an outer corona shield shielding the insulator; and
   an overhang corona shield shielding the insulator;
   wherein both the outer corona shielding and the overhang corona shielding comprise a first corona shielding material having a nonlinear field strength-dependent electrical resistance;
   wherein both the outer corona shielding and the overhang corona shielding comprise a second material having different electrical resistance from the first corona shielding material; and
   the first corona shielding material has an associated electrical resistance in a working range from 0.1 to 0.3 kV/mm of $10^4$ to $10^7$ Ωm; and
   wherein the first corona shielding material includes a matrix and a filler, the filler comprising partial discharge-resistant mica particles with average particle size of no more than one millimeter.

8. The electrical machine as claimed in claim 7, wherein the electrical machine comprises a high-voltage machine.

9. The electrical machine as claimed in claim 7, further comprising the first corona shielding material disposed on a main insulation of the electrical machine.

10. The electrical machine as claimed in claim 7, further comprising:
    at least one conductor bar; and
    wherein the corona shielding material, at least partly, is applied to the at least one conductor bar or the electrical insulation thereof or is arranged on the at least one conductor bar or the electrical insulation thereof.

* * * * *